(12) United States Patent
Kahlert

(10) Patent No.: US 9,254,564 B2
(45) Date of Patent: Feb. 9, 2016

(54) SUPPORT, HOLDING, AND/OR CARRYING APPARATUS

(76) Inventor: Ulrich Kahlert, Saarbrucken (DE)

( * ) Notice: Subject to any disclaimer, the term of this patent is extended or adjusted under 35 U.S.C. 154(b) by 529 days.

(21) Appl. No.: 13/701,195

(22) PCT Filed: May 25, 2011

(86) PCT No.: PCT/IB2011/001130
§ 371 (c)(1),
(2), (4) Date: Nov. 30, 2012

(87) PCT Pub. No.: WO2011/151695
PCT Pub. Date: Dec. 8, 2011

(65) Prior Publication Data
US 2013/0087588 A1    Apr. 11, 2013

(30) Foreign Application Priority Data
May 31, 2010   (DE) .......................... 10 2010 022 077

(51) Int. Cl.
| | |
|---|---|
| A45F 5/00 | (2006.01) |
| F16M 1/00 | (2006.01) |
| B25G 1/00 | (2006.01) |
| F16M 11/12 | (2006.01) |
| F16M 11/14 | (2006.01) |
| F16M 11/40 | (2006.01) |
| F16M 13/04 | (2006.01) |

(52) U.S. Cl.
CPC ............. B25G 1/002 (2013.01); F16M 11/123 (2013.01); F16M 11/14 (2013.01); F16M 11/40 (2013.01); F16M 13/04 (2013.01); *A45F 2200/0533* (2013.01); *F16M 2200/04* (2013.01); *F16M 2200/065* (2013.01)

(58) Field of Classification Search
CPC . B25G 1/002; F16M 13/04; A45F 2200/0533
USPC .......... 224/195, 201, 101; 396/420, 421, 422, 396/423, 424; 248/654
See application file for complete search history.

(56) References Cited

U.S. PATENT DOCUMENTS

| | | | | |
|---|---|---|---|---|
| 4,158,488 A | * | 6/1979 | Gottschalk et al. | ............ 352/243 |
| 4,298,149 A | * | 11/1981 | Gottschalk et al. | ............ 224/201 |
| 4,438,763 A | | 3/1984 | Zablen | |
| 4,748,712 A | * | 6/1988 | DiGiovanni | ................. 15/327.5 |
| 4,991,758 A | | 2/1991 | Eaneff | |

(Continued)

FOREIGN PATENT DOCUMENTS

| | | |
|---|---|---|
| DE | 202008000908 | 7/2008 |
| GB | 2 456 424 A | 7/2009 |

(Continued)

*Primary Examiner* — Justin Larson
*Assistant Examiner* — Lester L Vanterpool
(74) *Attorney, Agent, or Firm* — Lucas & Mercanti, LLP; Klaus P. Stoffel

(57) ABSTRACT

A support, holding, and/or carrying apparatus, especially for a device that has an elongate and movable arm which serves as a support, holder, or carrier, wherein the arm includes a hose provided for receiving a gaseous or liquid medium, which hose, when it has received the medium under pressure, is elastically bendable, and provided at the ends of the hose are elements for connecting the element to another part of the carrying apparatus and/or to the device. The elements are flanges connected gas-tight to the ends of the hose; preferably at least one of the flanges is provided with a valve for filling the hose with the medium.

17 Claims, 4 Drawing Sheets

(56) References Cited

U.S. PATENT DOCUMENTS

| | | | |
|---|---|---|---|
| 5,220,704 A * | 6/1993 | Flynn et al. | 15/321 |
| 5,360,196 A * | 11/1994 | DiGiulio et al. | 248/576 |
| 5,503,090 A * | 4/1996 | Guzan | 111/7.2 |
| 5,598,963 A * | 2/1997 | Buswell | 224/664 |
| 6,393,656 B1 * | 5/2002 | Paterson et al. | 15/327.5 |
| 6,450,377 B1 * | 9/2002 | Oriolo | 224/266 |
| 7,770,529 B2 * | 8/2010 | Phillips, Jr. | 111/7.3 |

FOREIGN PATENT DOCUMENTS

| | | | | |
|---|---|---|---|---|
| WO | 0236032 | 5/2002 | | |
| WO | WO 2009090393 A2 * | 7/2009 | | F16M 11/24 |

* cited by examiner

SUPPORT, HOLDING, AND/OR CARRYING APPARATUS

The present application is a 371 of international application PCT/IB2011/001130, filed May 25, 2011, which claims priority of DE 10 2010 022 077.9, filed May 31, 2010, the priority of these applications is hereby claimed and these applications are incorporated herein by reference.

BACKGROUND OF THE INVENTION

The invention relates to a support, holding, and/or carrying apparatus, especially for a device that has an elongate and movable arm for a support, holder, or carrier.

Such apparatus are in known use for holding grinding, milling, and assembly machines, medical technology machines, lamps, and motion picture cameras in a working position. The arm is attached at its one end to an upright or suspension unit, and the device is movably held at the other end. Handling the device is made significantly easier since the weight of the device is carried by the arm and does not have to be held by muscular strength.

Additionally, stabilization systems for motion picture cameras, e.g., "Steadicams," are known in which the arm holding the motion picture camera is attached to a harness that is to be arranged on the upper body of a person and the arm may be arranged in different working positions. The arm is made of elements connected to one another by joints, and these elements are held in each working position by springs that are adjusted to the weight of the motion picture camera.

SUMMARY OF THE INVENTION

The underlying object of the invention is to create an apparatus of the type cited in the foregoing that is lightweight.

This object is attained in accordance with the invention in that the arm includes a hose that has an elastic material and is provided for receiving a gaseous or liquid medium, which hose when filled with the medium under pressure is elastically bendable, and provided at the ends of the hose are means for connecting the hose to another part of the apparatus and/or to the device.

To use the arm, it is attached at one end to an upright, a suspension unit, a harness, or the like, and the other end is arranged or attached to the part and/or the device such that the arm is bent when it carries the part or the device. It then holds the aforesaid part or device movably and resiliently in a stable position. To this end the hose is filled with the medium with a pressure such that the hose is sufficiently stiff to hold the part or the device without buckling. The working position of the arm, especially the elevation at which the part or device is held, may be adjusted and adapted to the weight to be carried by regulating the pressure in the hose because the bendability of the hose is a function of the pressure applied. The weight of the apparatus is much lighter than that of an apparatus the arm of which is made of parts comprising a plurality of joints and solid bodies, especially when the hose is filled with a gas, e.g., air. Additionally, when the apparatus is not being used and the hose is not filled, the arm may be collapsed and stowed in a space-saving manner and is thus easier to transport.

The hose is usefully fashioned from an elastomer, e.g., rubber, and provided with a reinforcement that prevents the hose from buckling under the bending load. A bendable material that enhances the stiffness of the hose is usefully provided for reinforcement.

While it would be possible to place over the hose another flexible hose made of a stiffer material and to join the hoses to one another, e.g., by gluing them together, in one embodiment of the invention the reinforcement has fibers that are arranged on the hose and/or that are embedded in the elastic material of the hose. Bendable, high-strength fibers, preferably aramid fibers, are preferably used.

The fibers are usefully arranged at an angle between 5° and 85° to the longitudinal axis of the hose, advantageously at an angle between 15° and 75° to the longitudinal axis of the hose, and preferably at an angle between 25° and 65° to the longitudinal axis of the hose.

In one embodiment of the invention, at least two groups of parallel fibers are provided that run through and/or along the hose, possibly twisted into strands, with the fibers of the groups crossing one another.

If the hose is actuated by filling with a pressure, it expands radially and contracts axially. Since the bendability of the hose is a function of the circumference of the hose in addition to the pressure applied, the circumference of the hose may be changed, and thus the bendability of the hose may be adjusted, by increasing or decreasing the pressure.

In one preferred embodiment of the invention, the aforesaid means for connecting to the ends of the hose are flanges that are connected gas-tight and are preferably provided with a coupling element. At least one of the flanges is provided with a valve, preferably a conventional valve for tubes for bicycle or car tires, for filling the hose with the medium. The hose may be filled, e.g., using a conventional air pump or with a pressure cylinder.

In another embodiment of the invention, the apparatus includes a carrying harness device, possibly a movable carrying harness device, on which the arm is mounted, and a coupling element that cooperates with the flange is preferably positioned on the carrying harness device.

While the carrying harness device may be, for example, an upright, a suspension unit, or a harness, as stated in the foregoing, in one refinement of the invention, the carrying harness device has a carrying harness hose that is to be positioned around the torso of a human body and is supported on the torso, at least in part, preferably like a belt on the hips, and inflated.

The carrying harness hose is usefully fashioned from a synthetic fiber fabric that is rubberized on the interior and that is preferably made of polyester. The carrying harness hose is very stiff when inflated at a pressure of 3 to 5 bar. If the carrying harness hose is not needed, it may be collapsed and stowed in a space-saving manner if the air is emptied from it. It is very lightweight.

Provided at the ends of the carrying harness hose are means for securing the carrying harness hose to the torso so that the carrying harness hose may be adjusted individually like a belt to a person.

Usefully arranged on the ends of the carrying harness hose are flanges that seal the carrying harness hose in a gas-tight manner, as well as means for tightening the carrying harness hose and a valve for filling the hose tube with gas.

The apparatus additionally usefully includes a mounting element that is moveable on the arm, to which mounting element the device or another part of the apparatus may be attached.

While it would be possible to provide the mounting element with a joint, preferably a resilient joint, especially a spherical joint, in one embodiment of the invention it has a suspension unit with at least one rocker.

If the apparatus is moved, irregular movements are compensated by the movement of the rocker, especially if damping is provided for the rocking movement, and the device, especially a motion picture camera, may be moved smoothly.

In one refinement of the invention, the suspension unit has two rockers, wherein a rocker suspension unit of one of the rockers is connected to the side of the other rocker that performs a rocking movement, and the directions in which the rockers move are essentially perpendicular to one another. Irregular movements in two spatial directions may be compensated.

The suspension unit usefully includes a rolling bearing, the outer ring of which is preferably connected to one of the rockers.

The suspension unit, which may also be employed in other apparatus independent of the apparatus described herein, is suitable especially for holding motion picture cameras because, when it is being used, it is possible to compensate walking and turning movements of a cameraman during filming.

In another embodiment, the mounting element has an elongate inflatable hose stand assembly that is provided at one end with a means for attaching the device, especially the motion picture camera, and at the other end with a means for holding a weight and thus may be used as a two-sided lever for a stabilization stand, known per se, for the stabilization system cited in the foregoing.

The hose stand assembly is arranged within an inner ring of the rolling bearing and is connected to the inner ring.

As described for the load-bearing arm and carrying harness hose, the aforesaid means are provided with flanges that are connected gas-tight to the ends of the hose stand assembly, and at least one of these flanges is provided with a valve for filling the hose stand assembly with the gas. The hose stand assembly is usefully fashioned from a synthetic fiber fabric that is rubberized on the interior and that is preferably made of polyester. The hose stand assembly has high stiffness when inflated at a pressure of 7 to 8 bar and is significantly lighter in weight than the known stabilization stands that are fashioned from solid bodies. If it is not needed, it may be collapsed and stowed in a space-saving manner if the air is emptied from it and the hose stand assembly is collapsed.

The described hose stand assembly may also advantageously be employed independent of the described apparatus for other purposes, especially for stabilization systems for motion picture cameras.

The invention shall be described in greater detail in the following using an exemplary embodiment and the enclosed drawings that relate to this exemplary embodiment.

DETAILED DESCRIPTION OF THE INVENTION

Figure 1:
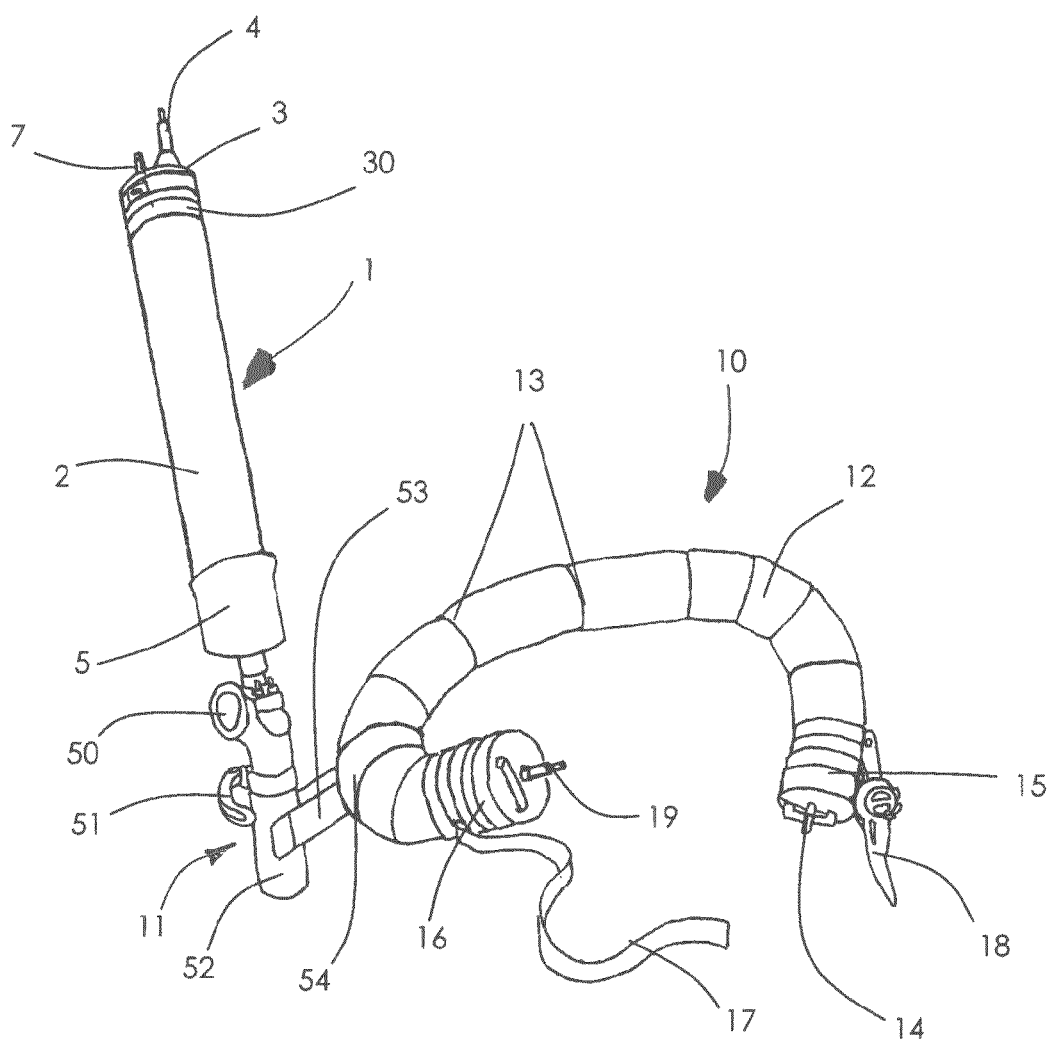
FIG. 1 is an isometric depiction of the inventive apparatus.

An inventive apparatus depicted in FIG. 1 has a load-bearing arm 1 for holding a device and a carrying harness device 10 to be positioned around the torso of a person that can be connected to one another via a coupling part 11.

Figure 2:
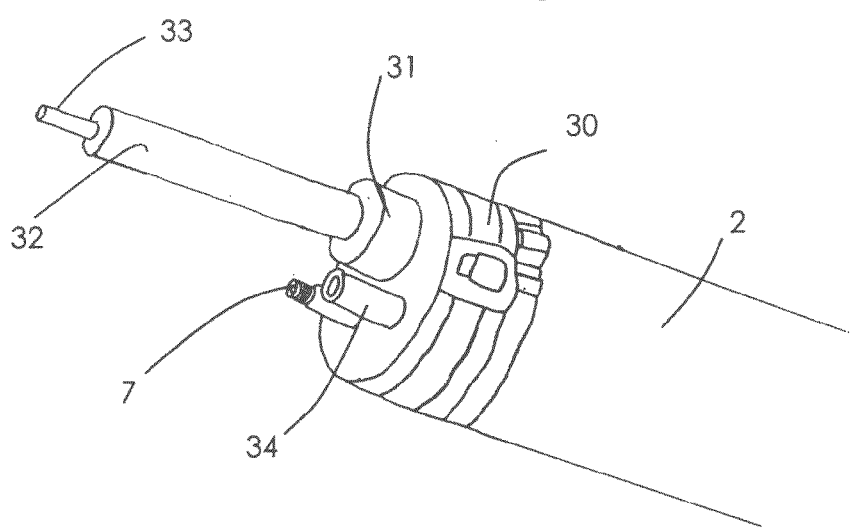
FIG. 2 is a detail of the inventive apparatus according to FIG. 1.

The load-bearing arm 1 includes a hose 2, the ends of which are sealed gas-tight with flanges 3. As can be seen in particular from FIG. 2, the hose 2 is clamped to the flange 3 with clamping rings 30. For filling the hose 2 with air, the flange 3 has a conventional valve 7 used for tubes for bicycle and car tires and a discharge valve 34. Additionally provided is a cylindrical receiving part 31 for receiving a retaining pin 32 that has a threaded projection 33. The retaining pin 32 may be arranged in the cylindrical receiving part 31 with a pin (not shown) that is guided through openings in the retaining pin 32 and in the receiving part and may thus be arranged in various positions.

Provided on the other side of the hose 2 is a blank flange (not shown) that is arranged in a connector 5 and that is attached to the hose 2 with clamping rings and that has an element with threaded bores for fastening it in the connector 5. Openings are provided on the bottom of the connector 5, and screws that are compatible with the threaded bores in the element of the blank flange are guided through them in order to screw the one load-bearing arm 1 securely to the one side of the connector 5. The connector 5 has an interior diameter that is approximately equal to the diameter of the hose 2 when the latter is filled with air under pressure, and it extends slightly on its upper open side.

The hose 2 is attached in the connector 5 and is securely borne there at its one end.

The hose 2 comprises a rubber unit 40 in which fibers are embedded that are made of a bendable, high-strength material, for instance aramid fibers. The fibers may be individually twisted to form strands 8, 9 in a fabric structure or may be randomly embedded in the rubber unit 40.

Figure 3:
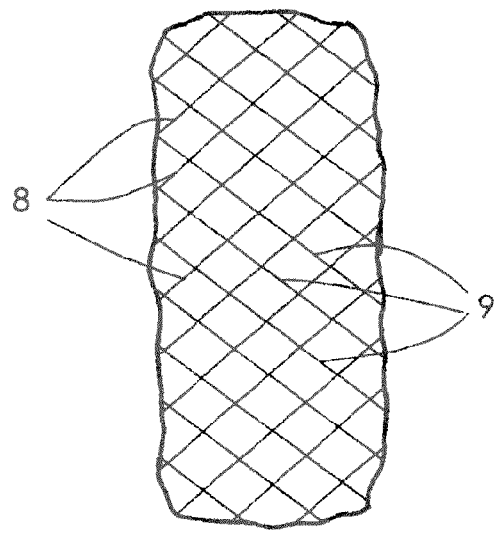
FIG. 3 is another detail of the inventive apparatus according to FIG. 1.
Figure 4:
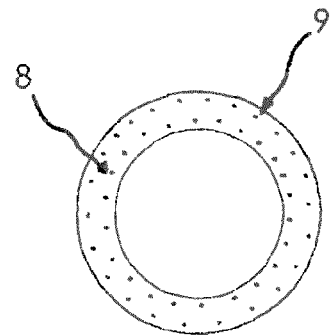
FIG. 4 is another detail of the inventive apparatus according to FIG. 1.

As can be seen in particular from FIGS. 3 and 4, in one preferred embodiment two groups of strands 8, 9 run parallel in the rubber unit 40 and are arranged in the rubber unit 40 at a distance from one another. As is depicted in FIG. 3 in a top view of a detail for the hose 2, the strands 8, 9 in each group are guided parallel to one another in the hose 2 in a coil-like manner at an angle of 45° over a longitudinal axis of the hose 2, the strands 8, 9 for each group being oriented in opposing directions relative to the longitudinal axis and crossing one another. As can be seen from FIG. 4, which depicts the cross-section of the hose 2, the strands 8 of the one group and the strands 9 of the other group are arranged in the rubber unit 40 of the hose 2 at a distance from one another, the group of the strands 8 being disposed further inward radially than the group of strands 9. When the fibers are oriented in this manner the hose 2 expands radially and contracts axially when it is acted upon with pressure.

The coupling element 11 depicted in FIG. 1 has an adjustable and lockable spherical joint 50, the ball of which is joined to the connector 5. The position of the connector 5 may be adjusted relative to the carrying harness device by means of this spherical joint 50.

One side of the spherical joint 50 that receives the ball is provided with a rod that is guided in a hollow cylinder 52 in a height-adjustable manner with a quick-release fastener 51. The hollow cylinder 52 is connected via connectors 53 to a cylindrical ring 54 that is guided around a hose 12 of the carrying harness device 10 and that has a diameter that is somewhat smaller than the hose 12 in the carrying harness device 10.

The hose 12 is a conventional fire hose tube that is fashioned from a synthetic fiber fabric made of polyester and rubberized on the interior. In order to impart a curved, beltlike shape to the hose 12, it is divided by seams 13 into a plurality of cylindrical tube sections that are angled to one another.

Flanges 15, 16 are located at the ends of the hose 12 and connected gas-tight to the hose 12 via clamping rings 41. The flange 15 is provided with a valve 14 for filling the hose 12 with air. The flange 16 has a discharge valve 19.

Additionally, for securing the carrying harness device 10, a strap 17 is provided on the flange 16 and a ratchet tensioning device 18 is provided on the flange 15.

Figure 5:
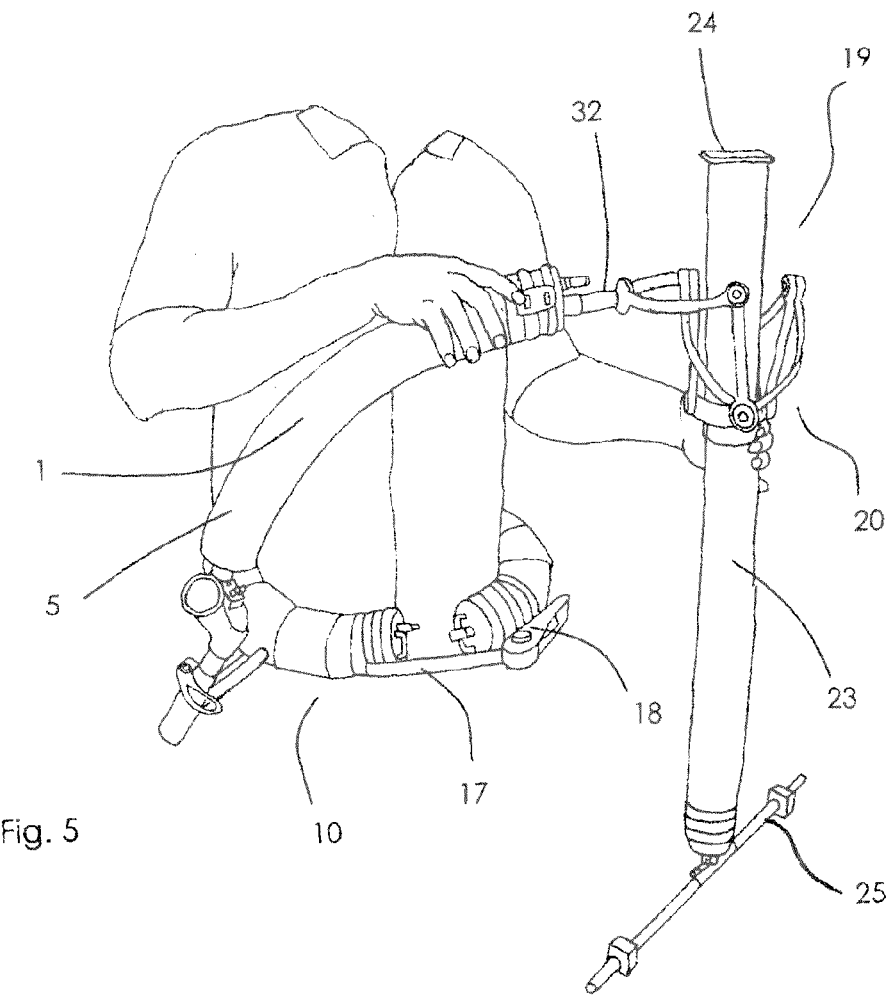
FIG. 5 is an isometric depiction of another inventive apparatus.
Figure 6:
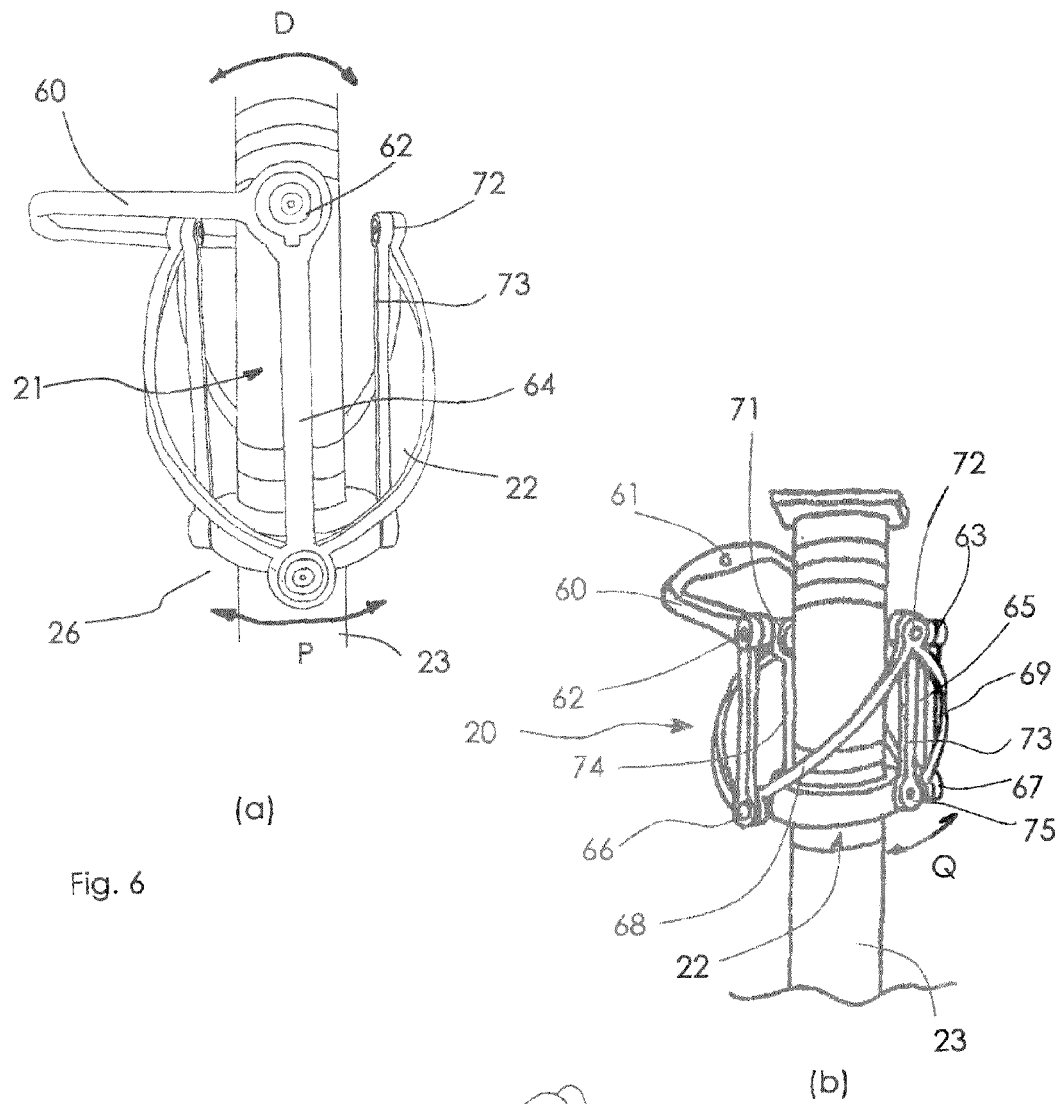
FIG. 6 is an isometric depiction of the apparatus according to FIG. 5.

To use the inventive apparatus, the pressure in the hose 12 of the carrying harness device 10 is pumped up to 3.5 to 5 bar using an air pump, or the hose 12 is filled using a gas cylinder, whereupon it assumes the shape of a belt, as shown especially in FIG. 5.

When pumped up, the hose 12 assumes a form that is rigid overall but also still somewhat flexible and, as shown in FIG. 5, may be placed around the hips of a person. In order to fit the hose 12 to the person, the belt 17 is secured using the ratchet 18 such that the carrying unit is positioned stably on the torso of the person.

Since the interior diameter of the cylindrical ring 54 of the coupling part 11 is smaller than the exterior diameter of the hose 12 when the latter has been pumped up, the cylindrical ring 54 is seated securely on the hose 12.

In order to use the hose 2 of the load-bearing arm for carrying or holding, it is filled with an air pressure of 6 to 8 bar and can carry a weight of up to 12 kg while bending without buckling.

A mounting element 19 may be attached via the retaining pin 32 to the load-bearing arm 1, or a device, for instance a grinding, milling, or assembly machine, may be attached directly. At its one end the hose 2 is securely borne in the connector 5. The hose 2 bends elastically under the load of the mounting element 19 or the device. The bottom part of the hose 2 is supported in the interior of a connector 5 in order to prevent it from buckling at the bottom.

The mounting element 19 or the device may be movably held in a comfortable position by the load-bearing arm 1 and maintained with minimum effort on the upper body of the person, the weight of the device and the apparatus being supported on the hips of the person.

The bending of the hose 2, and thus the elevation at which the mounting element or the device is positioned in front of the upper body, may be adjusted by regulating the pressure in the hose 2.

As can be seen in particular from FIG. 5, one embodiment of the apparatus additionally includes a stabilization stand 19 for a motion picture camera. The stabilization stand 19 has a suspension unit 20 that is connected to a hose stand assembly 23.

The suspension unit 20 includes an essentially semi-circular U-shaped part 60 that in its center has an opening 61 for engaging the retaining pin 32. Connected to the ends of the U-shaped part 60 via swivel joints 62, 63 are straight, downward hanging bars 64, 65 that are provided at their lower ends with swivel joints 66, 67. With the swivel joints 62, 63, 66, 67, the bars 64, 65 form a first rocker 21 that permits a rocking movement shown with the double arrow P. Connected to the swivel joints 66, 67 are quarter-circle shaped upwardly extending braces 68, 69 that are connected at their ends to one another and to swivel joints 71, 72. Bars 73, 74 are suspended from the swivel joints 71, 72 and at their lower ends have a swivel joint 75, 76 that is connected to an outer ring 27 of a rolling bearing 26. With the swivel joints 71, 72, 75, 76, the bars 73, 74 form a second rocker 22 that permits a rocking movement shown with the double arrow Q.

A hose stand assembly 23 is connected to an inner ring 28 of the rolling bearing 22.

Movements by the load-bearing arm 1 or carrying harness device 10 are largely compensated horizontally by the suspension unit 20 in that the hose stand assembly rocks in the suspension unit 20 in the directions of the double arrows P and Q. Additionally, swivel movements may be compensated in that the hose stand assembly 23 swivels in the rolling bearing 22 in one of the directions of the double arrow D.

It is particularly advantageous that the rocking movements may be damped in that the swivel joints 62, 63, 66, 67, 70, 71 are provided with a damping grease. This enables the motion picture camera to be guided in a particularly smooth manner when the apparatus is moved.

Like the carrying harness hose 12, the hose stand assembly 23 is fashioned from a synthetic fiber fabric with a rubberized interior. Arranged at its upper end is a flange 24 that is connected gas-tight to the hose stand assembly and that has a plate to which the motion picture camera may be attached. Provided at the lower end of the hose stand assembly 23 is another flange 25 that is connected gas-tight to the hose and that is provided a bar for holding a counterweight and a valve for filling the hose 23 with air.

When the hose stand assembly 23 is filled with an air pressure of 7 to 8 bar it becomes so stiff and rigid that it can carry the weight of the motion picture camera if it is attached to the flange 24 and can act as a two-armed lever between the motion picture camera and the weight that is to be attached at the bottom of the hose stand assembly.

Figure 7:
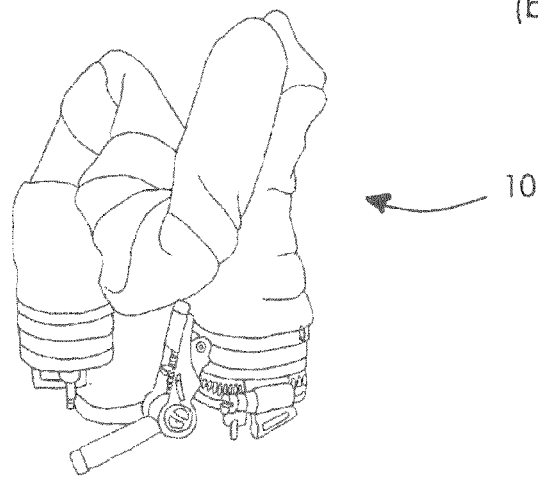
FIG. 7 is another depiction of the inventive apparatus according to FIG. 5.

As can be seen from FIG. 7, the load-bearing arm 1, carrying harness device 10, and stabilization stand 19 may be stored in a space-saving manner in a small space when the air is released from the hose 2, the carrying harness hose 12, and the hose stand assembly 23 and the hoses are collapsed.

Figure 8:
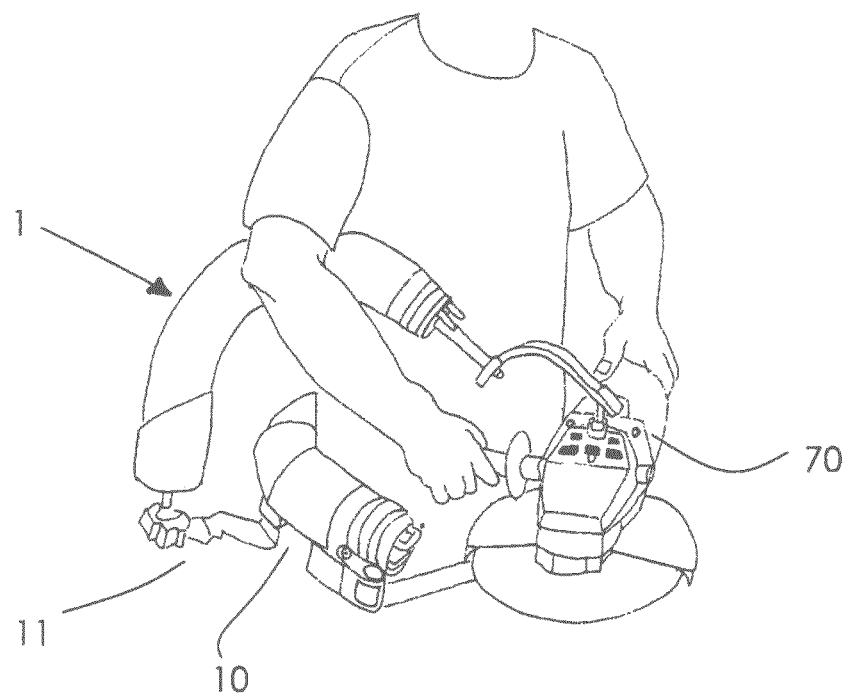
FIG. 8 is an isometric depiction of another inventive apparatus.
Figure 9:
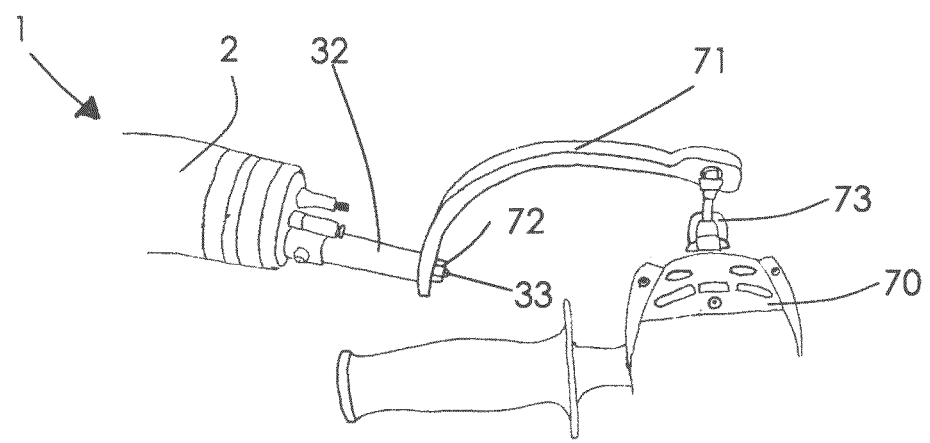
FIG. 9 is a detail of the inventive apparatus according to FIG. 8.

FIG. 8 and FIG. 9 depict the inventive apparatus as a carrying means for a sander 70. Arranged on the retaining pin 32 is a bent metal bar 71 from which the sander 70 is suspended. The bar 71 has an opening through which the threaded projection 33 of the retaining pin 32 is guided. The bar 71 is attached to the retaining pin 32 with a nut 72.

The sander has a ring 73 through which is guided a chain 74 that is attached to the bar 71.

The sander 70 is suspended from the apparatus and may be moved freely by hand in front of the upper body using the handles, the payload being largely borne by the load-bearing arm 1.

What is claimed is:

1. A support, holding, and/or carrying apparatus for a device that has an elongate and movable arm for a support, holder, or carrier, wherein the arm includes a hose provided for receiving a gaseous or liquid medium under pressure so that the arm is sufficiently stiff to support, hold or carry the device, provided at the ends of the hose are elements for connecting the arm to another part of the carrying apparatus and/or to the device, wherein the hose is elastically bendable when the hose has received the gaseous or liquid medium, wherein the hose in a bent state is sufficiently stiff to support, hold or carry the device without buckling.

2. The apparatus according to claim 1, wherein the connecting elements are flanges connected gas-tight to the ends of the hose.

3. The apparatus according to claim 2, wherein at least one of the flanges is provided with a valve for filling the hose with the medium.

4. The apparatus according to claim 1, wherein the hose has an elastic material and is provided with a bendable material that increases stiffness of the hose.

5. The apparatus according to claim 4, wherein the elastic material is an elastomer.

6. The apparatus according to claim 4, wherein the bendable having fibers arranged on the hose or embedded in the elastic material.

7. The apparatus according to claim 2, further comprising a carrying harness device on which the arm is held, and a coupling element that cooperates with the flange.

8. The apparatus according to claim 7, wherein the coupling element is arranged on the carrying harness device.

9. The apparatus according to claim 7, wherein the carrying harness device includes a carrying harness hose that is configured to be positionable around a torso of a human body and that is supportable at least in part on the torso and inflated.

10. The apparatus according to claim 9, wherein the carrying harness hose is configured to be supportable on the hips.

11. The apparatus according to claim 9, further comprising means, provided on ends of the carrying harness hose, for securing the carrying harness hose to the torso, and flanges having the means for securing are arranged on the ends of the carrying harness hose, and a valve is provided on at least one of the flanges for filling the carrying harness hose.

12. The apparatus according to claim 2, further comprising a mounting element with a suspension unit that has at least one rocker.

13. The apparatus according to claim 12, wherein the suspension unit has at least two rockers, a joint for one rocker being connected to a side of the other rocker that performs a rocking movement, the rockers having rocking directions that are substantially perpendicular to one another.

14. The apparatus according to claim 13, wherein the suspension unit includes a rolling bearing having an outer ring connected to a side of one of the rockers that performs a rocking movement.

15. The apparatus according to claim 13, wherein the mounting element has an elongate inflatable hose stand assembly that is provided at one end with a means for attaching the device.

16. The apparatus according to claim 15, wherein a second end of the hose stand assembly is provided with means for holding a weight.

17. The apparatus according to claim 15, wherein the hose stand assembly is arranged inside an inner ring of the rolling bearing and is connected to the inner ring.

* * * * *